United States Patent (10) Patent No.: US 7,561,305 B2
Kitagawara et al. (45) Date of Patent: Jul. 14, 2009

(54) IMAGE PROCESSING APPARATUS, IMAGE PROCESSING METHOD AND PROGRAM PRODUCT THEREFOR

(75) Inventors: Atsushi Kitagawara, Kanagawa (JP); Yoshiharu Hibi, Kanagawa (JP); Masaru Okutsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 866 days.

(21) Appl. No.: 10/936,783

(22) Filed: Sep. 9, 2004

(65) Prior Publication Data

US 2005/0157346 A1 Jul. 21, 2005

(30) Foreign Application Priority Data

Jan. 20, 2004 (JP) ............................ P2004-012067

(51) Int. Cl.
G06K 15/00 (2006.01)
G06K 9/00 (2006.01)
H04N 1/40 (2006.01)
H04N 1/60 (2006.01)
H04N 1/46 (2006.01)

(52) U.S. Cl. .................. 358/2.1; 358/1.9; 358/539; 382/162; 382/166

(58) Field of Classification Search .................. 358/2.1, 358/518, 3.24, 1.9, 3.07, 3.13, 3.23, 515, 358/520, 521, 523, 537; 382/167, 162, 164, 382/163, 173, 177, 180, 276, 282, 305; 395/117
See application file for complete search history.

(56) References Cited

U.S. PATENT DOCUMENTS

| 4,813,000 A | * | 3/1989 | Wyman et al. ............... 382/165 |
| 5,130,935 A | * | 7/1992 | Takiguchi ................... 358/518 |
| 5,222,154 A | * | 6/1993 | Graham et al. .............. 358/524 |
| 5,307,182 A | * | 4/1994 | Maltz ......................... 358/518 |
| 5,384,601 A | * | 1/1995 | Yamashita et al. .......... 358/520 |
| 5,448,379 A | * | 9/1995 | Ishihara et al. .............. 358/518 |
| 5,450,314 A | * | 9/1995 | Kagami et al. ................. 706/46 |
| 5,638,496 A | * | 6/1997 | Sato .......................... 358/1.9 |
| 5,668,633 A | * | 9/1997 | Cheetam et al. ............. 356/402 |
| 5,717,783 A | * | 2/1998 | Endo et al. .................. 358/518 |
| 5,724,441 A | * | 3/1998 | Yoshida ...................... 358/1.9 |
| 5,771,311 A | * | 6/1998 | Arai .......................... 358/518 |
| 5,911,004 A | * | 6/1999 | Ohuchi et al. ............... 358/462 |
| 5,936,749 A | * | 8/1999 | Ikeda ......................... 358/515 |

(Continued)

FOREIGN PATENT DOCUMENTS

JP 7-105344 4/1995

(Continued)

*Primary Examiner*—Twyler L Haskins
*Assistant Examiner*—Jonathan R Beckley
(74) *Attorney, Agent, or Firm*—Morgan, Lewis & Bockius LLP (57) ABSTRACT

An image processing apparatus includes: a region recognizing unit that recognizes a region to be subjected to spot color processing in a digital image that is read from an image database in which a plurality of digital images are stored; a color information acquiring unit that acquires target color information to serve as a replacement target in the spot color processing; and a converting unit that converts color information of the region recognized by the region recognizing unit into the target color information acquired by the color information acquiring unit.

14 Claims, 6 Drawing Sheets

U.S. PATENT DOCUMENTS

| | | | | |
|---|---|---|---|---|
| 6,014,457 | A * | 1/2000 | Kubo et al. | 358/518 |
| 6,058,207 | A * | 5/2000 | Tuijn et al. | 358/518 |
| 6,115,492 | A * | 9/2000 | Meltzer et al. | 382/162 |
| 6,342,952 | B1 * | 1/2002 | Chan | 358/1.9 |
| 6,351,557 | B1 * | 2/2002 | Gonsalves | 382/167 |
| 6,449,060 | B1 * | 9/2002 | Kawai et al. | 358/1.9 |
| 6,453,069 | B1 * | 9/2002 | Matsugu et al. | 382/173 |
| 6,559,975 | B1 * | 5/2003 | Tolmer et al. | 358/1.9 |
| 6,594,030 | B1 * | 7/2003 | Ahlstrom et al. | 358/1.15 |
| 6,606,166 | B1 * | 8/2003 | Knoll | 358/1.9 |
| 6,628,829 | B1 * | 9/2003 | Chasen | 382/167 |
| 6,665,095 | B1 * | 12/2003 | Janssen et al. | 358/2.1 |
| 6,763,124 | B2 * | 7/2004 | Alattar et al. | 382/100 |
| 6,771,384 | B1 * | 8/2004 | Laverty et al. | 358/1.15 |
| 6,853,466 | B1 * | 2/2005 | Harada et al. | 358/1.9 |
| 6,873,441 | B1 * | 3/2005 | Kuwabara et al. | 358/3.26 |
| 6,897,988 | B1 * | 5/2005 | Saito et al. | 358/515 |
| 6,899,431 | B2 * | 5/2005 | Wada | 358/2.1 |
| 6,917,704 | B2 * | 7/2005 | Kojima et al. | 382/166 |
| 6,972,772 | B1 * | 12/2005 | Chen et al. | 345/589 |
| 6,993,149 | B2 * | 1/2006 | Brunk et al. | 382/100 |
| 6,995,865 | B1 * | 2/2006 | Motomura | 358/1.9 |
| 7,031,510 | B2 * | 4/2006 | Imamura et al. | 382/147 |
| 7,085,006 | B2 * | 8/2006 | Yokoyama et al. | 358/1.9 |
| 7,239,402 | B2 * | 7/2007 | Soler et al. | 358/1.9 |
| 7,274,487 | B2 * | 9/2007 | Fukasawa | 358/1.9 |
| 7,277,202 | B2 * | 10/2007 | Chan | 358/1.9 |
| 7,355,748 | B2 * | 4/2008 | Arai et al. | 358/1.9 |
| 7,356,190 | B2 * | 4/2008 | Mizoguchi et al. | 358/518 |
| 2003/0021478 | A1 * | 1/2003 | Yoshida | 382/195 |
| 2006/0013478 | A1 * | 1/2006 | Ito et al. | 358/1.9 |

FOREIGN PATENT DOCUMENTS

| | | |
|---|---|---|
| JP | 8-187899 | 7/1996 |
| JP | 9-65157 | 3/1997 |
| JP | 2002-247403 | 8/2002 |
| JP | 2003-134349 | 5/2003 |

* cited by examiner

IMAGE PROCESSING APPARATUS, IMAGE PROCESSING METHOD AND PROGRAM PRODUCT THEREFOR

BACKGROUND OF THE INVENTION

1. Field of the Invention

The present invention relates to an image processing apparatus that process a captured image or the like and, more specifically, to an image processing apparatus and a program product therefore that correct digital images including image data having a special color.

2. Description of the Related Art

In recent years, work of capturing a digital image taken by a digital camera (digital still camera: DSC) or read by a scanner and displaying it on a display device or printing it with a printer has come to be performed widely. Also, work of putting, into a database, digital image data taken by different digital cameras under different conditions (different light sources, locations, times, etc.) and then outputting (visualizing) an edited layout image where images are arranged at prescribed regions has come to be performed commonly. Such kinds of work are performed in a wide variety of scenes such as fields such as the printing market of using images for product handbills, advertisements, magazine articles, etc., the business market of producing exhibition and seminar materials, photographs for recording actual sites, snapshots of merchandise such as real estate properties and products, and like things, and the personal markets in which general users use images personally.

A digital image taken by a digital camera or the like may contain an object having a special color (spot color) such as a corporate color that is used for a corporate logo or the like or a main color of a commodity. In film packages, for example, there may occur a case that a corporate color and a package color are the same. On the other hand, as a future trend of color printers, a technique for forming, in a full-color printer, an image using a colorant of a particular color that cannot be expressed or hard to express by the four colors (yellow, magenta, cyan, and black) that are used ordinarily in full-color printers is now being studied.

Among background art techniques disclosed as patent publications is a technique that is used in image processing for binarizing a color image such as a business document having a relatively small number of colors. Limited colors are detected from color image signals and converted into color codes, and the color image signals are subjected to a bit map conversion. And input color image data are reproduced by limited colors (see JP-A-9-065157 on page 5 and FIG. 3). Another technique relates to spot color processing in a printer. A color patch is scanned by a scanner, and then printing on a 5 printing medium is performed by automatically using the scanned color and similar colors within a certain range around the scanned color (see JP-A-2003-134349 see pages 4 and 5, and FIG. 1).

SUMMARY OF THE INVENTION

However, the conventional spot color processing (special color processing) remains such as to determine a corporate logo in headlines in a document using application software and give information of a limited color to it. In general, it is relatively easy to reproduce, in a desired color, prescribed regions of flat (i.e., gradationless) image such as a business document. However, if the conventional spot color processing is applied to a digital image as obtained by capturing a commodity, a monochrome (i.e., gradationless) image would be obtained. In digital images such as photographs, gradations cannot be expressed by simple spot color processing because the color information varies on a pixel-by-pixel basis. Further, in the conventional spot color processing, an operation of conversion into YMCK (yellow, magenta, cyan, black) image data is performed by using, for example, Pantone numbers or DIC numbers (i.e., numbers in a sample book of Dainippon Ink and Chemicals, Inc.). However, such processing is simple replacement of limited colors because a lightness signal and color signals cannot be separated from each other.

Further, when captured under different conditions (light sources, locations, or times) or by different capturing devices (digital still cameras or the like), captured images of even the same object are given different color reproduction results. The color reproduction result also depends on the type, characteristics, etc. of the image display device such as a display device or the output device such as a printer. As a result, a corporate color, a commodity package color, or the like in an output image becomes subtly different from the true color, giving different commodity impressions to customers. The corporate color or the like varies if the color of an object is reproduced faithfully. It is preferable in terms of brand image appeal that the reproduced corporate color or the like be always the same even if different objects are used. In particular, where a plurality of captured images are arranged and then displayed in a single picture or printed on a single sheet, variation of an important color such as a corporate color is not preferable.

The present invention has been made to solve the above technical problems, and one of objects of the invention is therefore to properly reproduce a high-priority color such as a corporate color or a commodity image color existing in a digital image of a commodity photograph or the like, to thereby attain maximum commodity or brand image appeal.

Another object is to give a consistent commodity or brand impression when digital images taken under different conditions or by different capturing devices are output in an array.

A further object is to reproduce the same brand color, corporate color, or an image color consistently even if the package print color itself varies among commodities.

According to a first aspect of the invention, there is provided an image processing apparatus including: a region recognizing unit that recognizes a region to be subjected to spot color processing in a digital image that is read from an image database in which a plurality of digital images are stored; a color information acquiring unit that acquires target color information to serve as a replacement target in the spot color processing; and a converting unit that converts color information of the region recognized by the region recognizing unit into the target color information acquired by the color information acquiring unit.

According to a second aspect of the invention, there is provided an image processing apparatus including: an image input unit that receives a plurality of digital images that are read from an image database in which digital images are stored; an object recognizing unit that recognizes a region to be subjected to spot color processing for each of the plurality of digital images received by the image input unit; and a spot color processing unit that converts color information of the region recognized by the object recognizing unit into the same spot color for each of the plurality of digital images.

According to a third aspect of the invention, there is provided an image processing method including: reading a digital image from storing unit in which a plurality of digital images are stored; determining a subject region in the digital image, the subject region subjected for a color replacement process; replacing a color of the determined subject region with a color including at least one of a corporate color and a commodity main color; and storing the digital image in which the color of the subject region has been replaced in the storing unit.

According to a fourth aspect of the invention, there is provided an image processing program product for causing a computer to execute procedures including: reading a digital image from storing unit in which a plurality of digital images are stored; determining a subject region in the digital image, the subject region subjected for a color replacement process; replacing a color of the determined subject region with a color including at least one of a corporate color and a commodity main color; and storing the digital image in which the color of the subject region has been replaced in the storing unit.

BRIEF DESCRIPTION OF THE DRAWINGS

The above objects and advantages of the present invention will become more apparent by describing in detail with reference to the accompanying drawings, wherein.

DETAILED DESCRIPTION OF THE PREFERRED EMBODIMENT

An embodiment of the present invention will be hereinafter described in detail with reference to the accompanying drawings.

Figure 1:
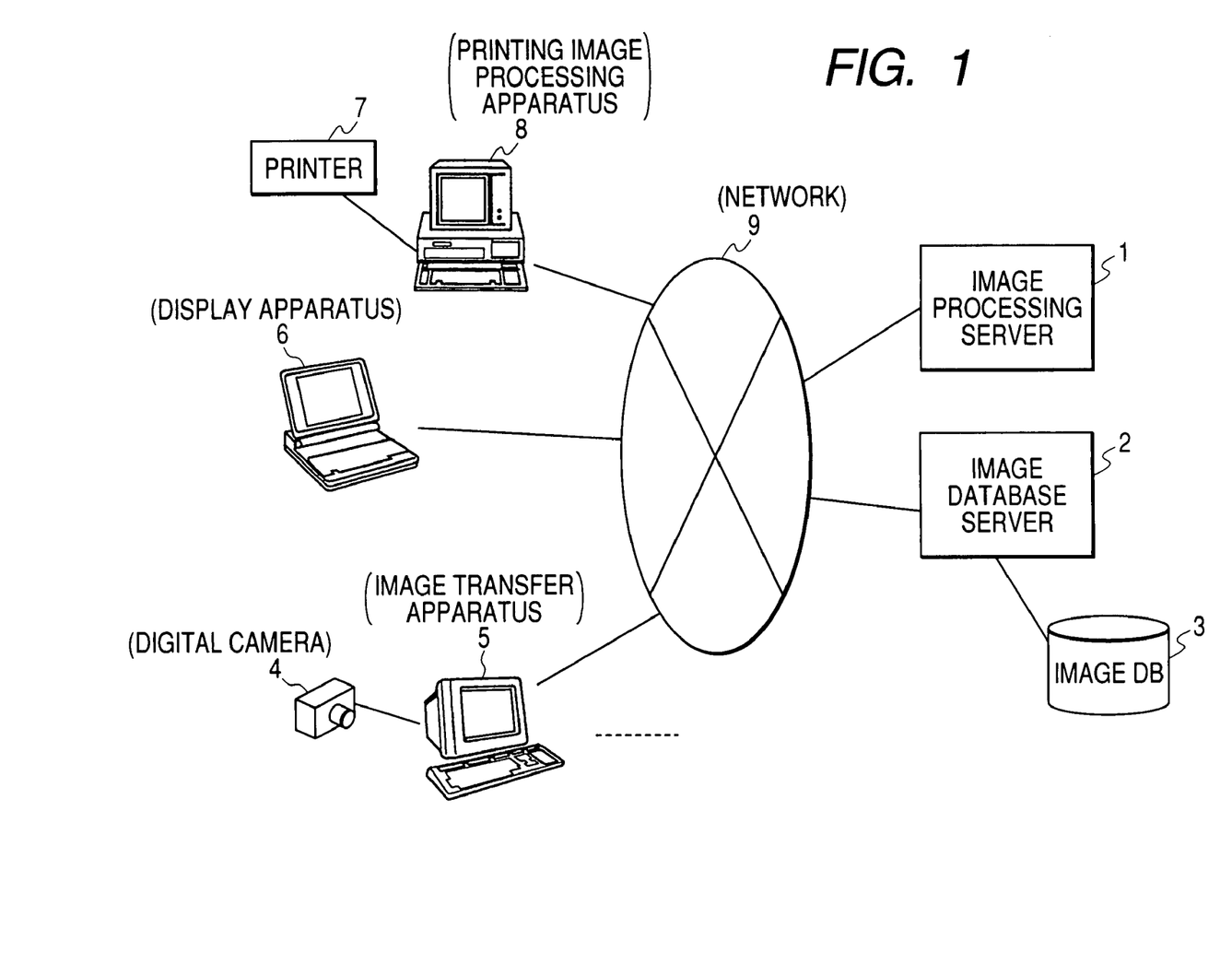
FIG. 1 shows the entire configuration of an exemplary image processing system according to an embodiment.

FIG. 1 shows the entire configuration of an exemplary image processing system according to the embodiment. In this image processing system, various functions (apparatus) are connected to each other via a network 9 such as the Internet. The image processing system of FIG. 1 is provided with an image processing server 1 for performing spot color processing and unified layout processing on images (digital images) that were taken in a distributed manner, an image database server 2 for acquiring digital images that were taken in a distributed manner and images that have been subjected to the spot color processing, and one or a plurality of image databases (image DBs) 3 that are connected to the image database server 2 and store digital images that were taken in a distributed manner. The image processing system is also provided with various user terminals such as image transfer apparatus 5 for reading digital images taken by digital cameras 4 as capturing means and transferring those to the image database server 2 via the network 9, a display apparatus 6 for displaying digital images that have been subjected to the spot color processing in the image processing server 1, and an printing image processing apparatus 8 for performing various kinds of image processing that are necessary for allowing a printer 7 as an image print output means to output digital images that have been subjected to the spot color processing in the image processing server 1.

Each of the image transfer apparatus 5, the display apparatus 6, and the printing image processing apparatus 8 may be a computer such as a notebook-sized computer (notebook-sized PC) or a desktop PC. Each of the image processing server 1 and the image database server 2 may be provided by one of various kinds of computers such as PCs. According to the embodiment, a plurality of digital images that were taken in a distributed manner at different locations under different capturing conditions can be subjected to the spot color processing and can be unified together To this end, in the example of FIG. 1, the plurality of digital cameras 4 are provided and the plurality of image transfer apparatus 5 that are connected to the respective digital cameras 4 are connected to the network 9. In the embodiment, the term "spot color processing" means processing of replacing an important color (corporate color, commodity main color) existing in a digital image with a color signal value(s) that is generated according to color information prepared in advance (e.g., Pantone numbers, DIC numbers, L*a*b* values, or YCC values).

For example, each of the image processing server 1 and the image database server 2 and each of the image transfer apparatus 5, the display apparatus 6, and the printing image processing apparatus 8 that are PCs or the like are equipped with a CPU (central processing unit) for controlling the entire apparatus and performing computation, a ROM in which programs for operation of the apparatus are stored, a RAM (e.g., DRAM (dynamic random access memory)) that is an internal storage device as a work memory for the CPU, and I/O circuits that are connected to input devices for accepting an input from a user that are a keyboard, a mouse, etc. and output devices such as a printer and a monitor and that manage input to and output from those peripheral devices. Each of the above apparatus is also equipped with a VRAM (video RAM) or the like as a work memory to which sample images etc. to be output on an output device for monitoring are written, as well as an HDD (hard disk drive) and an external storage device that is one of various disc storage devices such as a DVD (digital versatile disc) device and a CD (compact disc) device. The image database 3 may be such an external storage device.

Figure 2A:
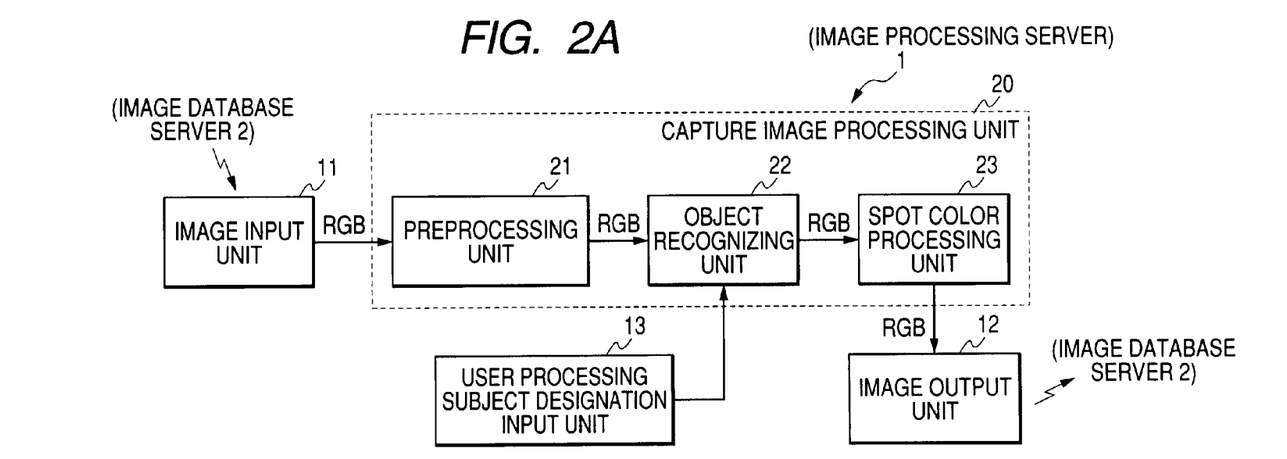
FIGS. 2A and 2B show functional blocks for performing spot color processing according to the embodiment.
Figure 2B:
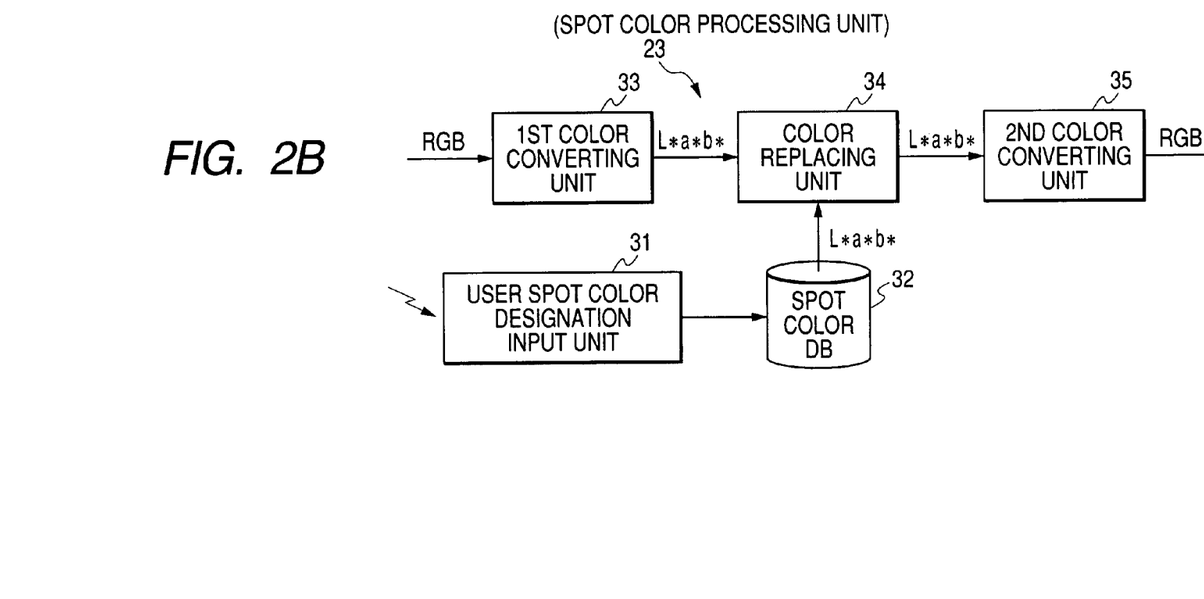

FIGS. 2A and 2B show functional blocks for performing the spot color processing according to the embodiment. As shown in FIG. 2A, the image processing server 1 that mainly performs the color spot processing is equipped with an image input unit 11 for acquiring image data (digital images) stored in the image database 3 from the image database server 2, a capture image processing unit 20 that mainly performs the spot color processing on a plurality of images received by the image input unit 11, and an image output unit 12 for sending spot-color-processed digital images back to the image database server 2 so as to be stored in the image database 3. The image processing server 1 is also equipped with a user processing subject designation input unit 13 for recognizing a designated subject (designation is made through a user terminal) to be replaced by an important color (corporate color, commodity image color, or the like). The recognition by the user processing subject designation input unit 13 is made by receiving, via the network 9, data that is input through a user terminal such as the display apparatus 6 or the printing image processing apparatus 8 by using a prescribed user interface. Exemplary data to be recognized are a corporate color name, a commodity image color name, a package shape, and a logo shape.

An object such as a commodity is lit up and captured by, for example, one of the digital cameras 4 shown in FIG. 1. At this time, the capturing conditions vary depending on the type (color temperature), the degree of deterioration, variations, etc. of the light source. In the case of outdoor capturing, the capturing conditions vary also depending on the location, weather, and various support devices such as a reflection plate. The capturing conditions also depends on the CCD (charge coupled device), imaging spectral characteristic, lens characteristics, and circuit configuration of the digital camera 4. Therefore, the quality of a resulting digital image is influenced by the illumination conditions and the camera characteristics. In general, a captured digital image complies with a standard format of the RGB color space. Digital images thus obtained are accumulated in the image database 3 via the image database server 2. The digital images thus obtained may be either ones taken at a single location or ones taken at a plurality of locations. Naturally, the quality levels of the digital images vary more widely when they are taken at a plurality of locations.

Digital images accumulated in the image database 3 are subjected to the image processing according to the embodiment in the capture image processing unit 20. The image-processed digital images are stored in the image database 3 again. To display the image-processed digital images on a display device, for example, of the image processing server 1, they are read from the image database 3 and displayed on the display device via a display image processing unit (not shown). To display the image-processed digital images on a display device located at a distant place such as the display apparatus 6, the display at the distant place is enabled by delivering them via the network 9 and a Web server using the display image processing unit (not shown). To print out the image-processed digital images with the printer 7, for example, they are supplied to the printer 7 via a printing image processing unit (not shown) and the printing image processing apparatus 8. The display image processing unit corrects various parameters on the basis of characteristics unique to the display device. As for the image signal color space, conversion is made from the original RGB signals into RGB signals obtained by correcting for the characteristics unique to the display device. The printing image processing unit performs image processing that is similar to image processing performed by general printers and thereby corrects for characteristics unique to the output device. As for the image signal color space, conversion is made from the RGB signals into YMCK (yellow, magenta, cyan, and black) signals obtained by correcting for the characteristics unique to the printer.

As shown in FIG. 2A, the capture image processing unit 20 is equipped with a preprocessing unit 21 for performing preprocessing for the spot color processing, an object recognizing unit 22 for recognizing an object to be subjected to the spot color processing, and a spot color processing unit 23 for performing the spot color processing actually. The preprocessing unit 21 performs, on an input digital image, preprocessing such as image size normalization, noise elimination, and a general lightness correction. In the case of displaying a plurality of digital images in thumbnails (i.e., in an array), the plurality of digital images to be displayed in thumbnails are subjected to preprocessing such as size and color space equalization. The object recognizing unit 22 separates a captured object and background from each other and determines a region to be subjected to the spot color processing. These kind of processing may be general ones and are intended to clarify a processing target and to prevent occurrence of problems such as background noise. The spot color processing unit 23 performs the spot color processing on the object that has been separated from the background by the object recognizing unit 22.

The object recognizing unit 22 identifies a region to be subjected to the spot color processing from the digital image such as a photograph on the basis of a designated corporate color name, commodity image color name, package shape, and logo shape that has been recognized by the user processing subject designation input unit 13, for example. If a color (e.g., green of a particular package) has been designated, an object of green that is in a prescribed range with respect to a particular color (e.g., the green of the particular package) is selected and displayed on the user terminal in such a manner as to be discriminated. The capture image processing unit 20 may be configured so as to perform the spot color processing on the digital image upon input of confirmation of the designation through the user terminal, for example. Another configuration is possible in which the function of the object recognizing unit 22 is included in the functions of a color replacing unit 34 (described later) shown in FIG. 2B and the identification of a subject of color replacement and the replacement processing are performed together on the basis of designation via the user spot color designation input unit 31.

FIG. 2B shows the configuration of the spot color processing unit 23. The spot color processing unit 23 is equipped with the user spot color designation input unit 31 for receiving designation of a spot color from a user terminal such as the display apparatus 6 or the printing image processing apparatus 8 via the network 9, and a spot color database (BD) 32 for storing sets of conversion target signals (target signals) of spot colors such as corporate colors. The spot color database 32 is an HDD or any of other various kinds of memories. The spot color processing unit 23 is also equipped with a first color converting unit 33 for replacing RGB (red, green, and blue) signals of a digital image to be subjected to the spot color processing with L*a*b* signals (L*a*b*: luminance/color difference uniform color space), the color replacing unit 34 for replacing the color signals of the L*a*b* signals with the target signals of the spot color that is obtained from the spot color database 32, and a second color converting unit 35 for converting L*a*b* signals produced by the color replacing unit 23 by the replacement into RGB signals. The user spot color designation input unit 31 recognizes a color number such as a Pantone number or a DIC number that is input by a designer, for example, and that is handled by a general design tool. Alternatively, it is possible to input RGB values for expression of additive color mixture occurring in a display device or YMCK values for expression of subtractive color mixture that is used in a process of printing. In this case, it is necessary to provide processing of a unique conversion to L*a*b* values on the basis of conditions that prescribe the above color space.

Next, a flow of processing that is performed by the blocks of FIGS. 2A and 2B will be described.

Figure 3:
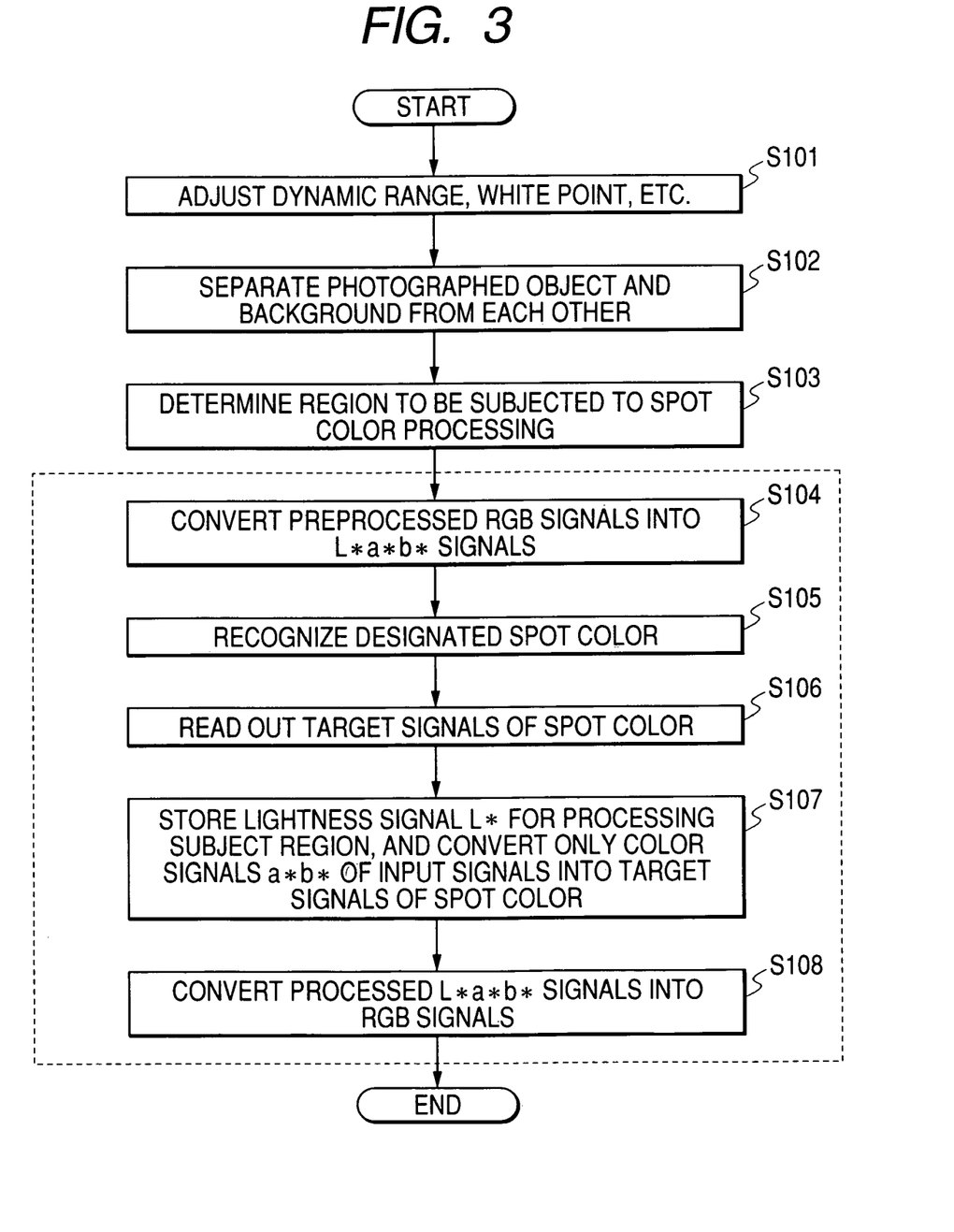
FIG. 3 is a flowchart of a process that is executed by a capture image processing unit including a spot color processing unit.

FIG. 3 is a flowchart of a process that is executed by the capture image processing unit 20 including the spot color processing unit 23. The preprocessing unit 21 performs preprocessing such as general corrections of a lightness correction, dynamic range correction, and a white point correction (step 101). In the case of performing processing of unifying digital images that were taken under plural sets of conditions, such processing as image size normalization and color space equalization is performed. Then, the object recognizing unit 22 performs an operation of separating a captured object and background from each other (step 102). For example, if a package of a roll of capturing film is an object, in a photograph (digital image), the film package as the object is separated from a background such as a desk on which the film package is placed or wallpaper. A region to be subjected to the spot color processing is determined from the separated object (step 103).

Then, the spot color processing unit 23 performs the spot color processing. In the spot color processing, first, the first color converting unit 33 of the spot color processing unit 23 converts the preprocessed RGB signals into L*a*b* signals (L*a*b*: uniform color space) (step 104). The color space is not limited to L*a*b* and may be YCC or the like as long as it enables separate handling of luminance information and color information. The embodiment employs L*a*b*. In the L*a*b* color space, L* represents the luminance (lightness) and a*b* represents the color (color differences). In the YCC color space, Y represents the luminance (lightness) and CC represents the color (color difference).

The user spot color designation input unit 31 receives input of a spot color (e.g., corporate color) from a user via the user interface and recognizes the designated spot color for the recognized object (step 105). The color replacing unit 34 reads target signals of the spot color from the spot color database 32 (step 106). The lightness signal L* is stored for the processing subject region and only the color signals a*b* of the input signals are converted into the target signals of the spot color (step 107).

Figure 4:
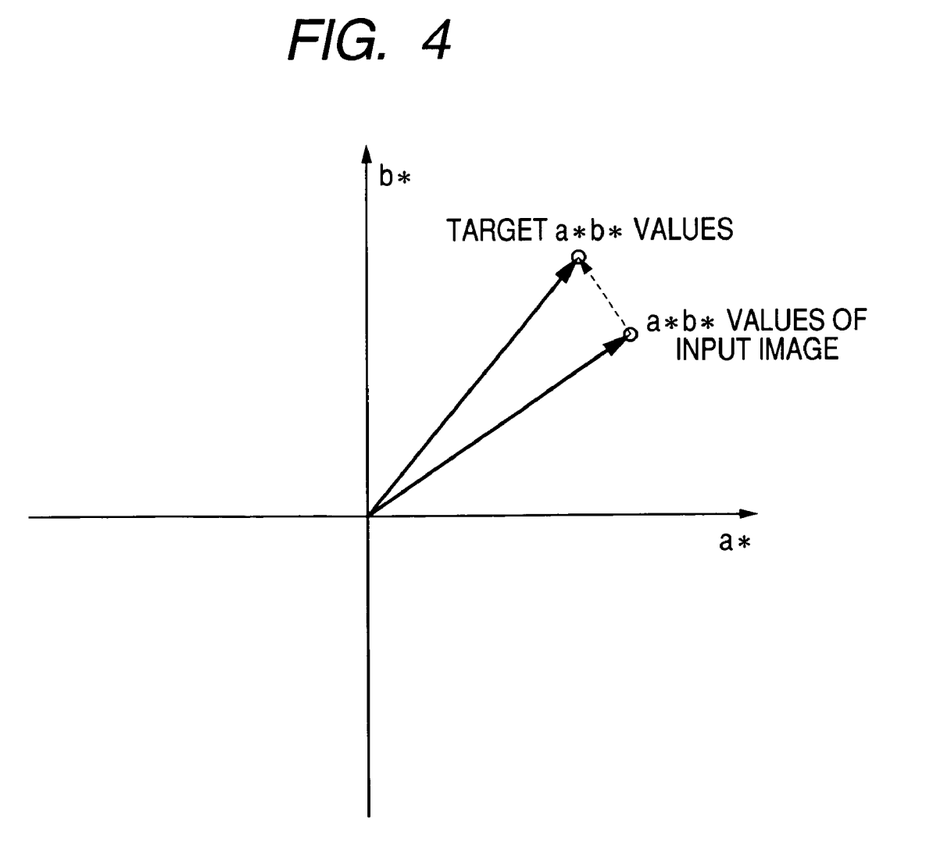
FIG. 4 conceptually illustrates color replacement processing of a color replacing unit on the a*-b* plane of the CIE L*a*b* color space.

FIG. 4 conceptually illustrates the color replacement processing of the color replacing unit 34 on the a*-b* plane of the CIE L*a*b* color space. In FIG. 4, the horizontal axis and the vertical axis are the a* axis and the b* axis, respectively. The horizontal axis a* approaches red as the value increases in the positive direction and approaches green as the value increases in the negative direction. The vertical axis b* approaches yellow as the value increases in the positive direction and approaches blue as the value increases in the negative direction. FIG. 4 shows an example in which a*b* values of an input image are replaced by those of target signals. For example, green as a package design color of a commodity (e.g., a film package) is replaced by green as a designated brand or corporate color in a green region of image signals. Simple replacement does not cause any problems in the case of a corporate logo that is used in document headlines to which the general spot color processing is applied. However, if simple replacement were performed on a digital image as a captured image, a reproduction image would be unnatural. In of this, in the embodiment, in a color replacement region of an object, a lightness signal L* is stored and only color signals a*b* of an input signal are converted into target signals of a spot color.

Since as described above a gradation representation of a captured image is stored and only its color representation is converted into a spot color, the captured image can be reproduced naturally. Likewise, a plurality of captured images of a commodity can be corrected for differences and variations in the capturing conditions such as illumination of a digital camera 4 and even for a color variation occurring at the time of printing of commodity packages which is a fundamental problem. As a result, a brand image color or a commodity image color can be reproduced consistently.

After step 107 is executed in the above-described manner, the second color converting unit 35 of the spot color processing unit 23 converts the resulting L*a*b* signals into RGB signals (step 108). The processing of the capture image processing unit 20 is thus finished.

Figure 5:
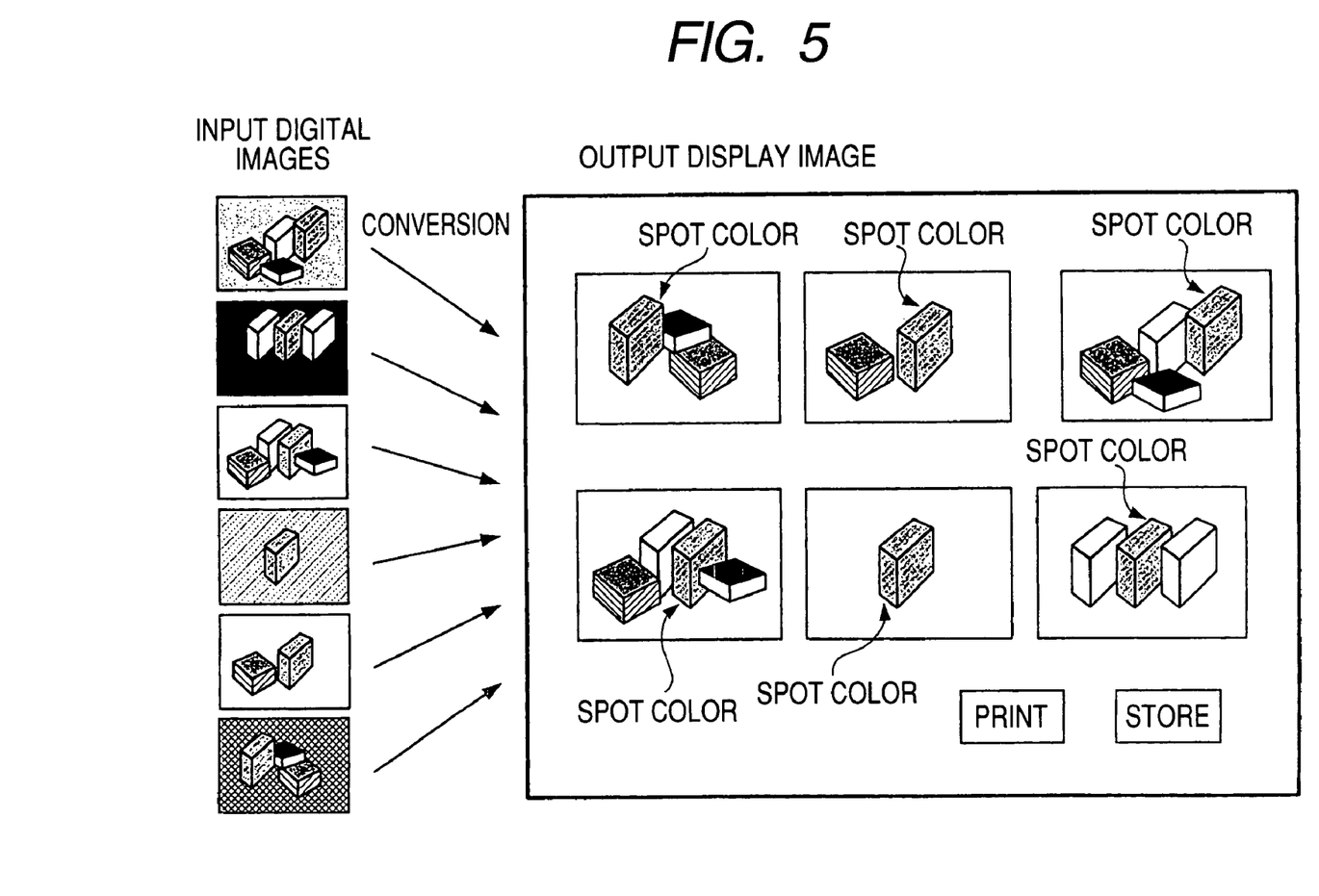
FIG. 5 shows an example in which unified layout processing is performed on a plurality of input digital images and resulting images are displayed in an array on a display device.

FIG. 5 shows an example in which unified layout 15 processing is performed on a plurality of input digital images and resulting images are displayed in an array on the display apparatus 6, the printing image processing apparatus 8, or the like. In this example, six digital images are read from the image database 3 and input to the image processing server 1. In the image processing server 1, the above-described functional blocks operate in the above-described manners, whereby a processing subject region is determined and an instruction of a user is recognized and a spot color as a target is thereby read 25 from the spot color database 32. The spot color processing is performed in the capture image processing unit 20, whereby the colors of processing subject regions in the six digital images to constitute an output display image are converted into the spot color. As a result, a plurality of digital images that are displayed in an array (in thumbnails) are output in such a manner that the same commodity package, for example, is given a unified spot color (e.g., a commodity image color that is expressed on the package). A brand image color or a commodity image color can thus be reproduced consistently.

In the example of FIG. 5, the prescribed unified layout processing performed in addition to the spot color processing. The unified layout processing is classified into geometrical processing and image quality processing. The geometrical processing includes layout adjustments for, for example, unifying the positions and sizes of main objects. The image quality processing includes unification of lightness values, unification of backgrounds, noise elimination, and a tone adjustment. Performing the unification processing (i.e., making the above adjustments) makes it possible to produce more easy-to-see output images for objects that are subjected to the spot color processing.

Figure 6:
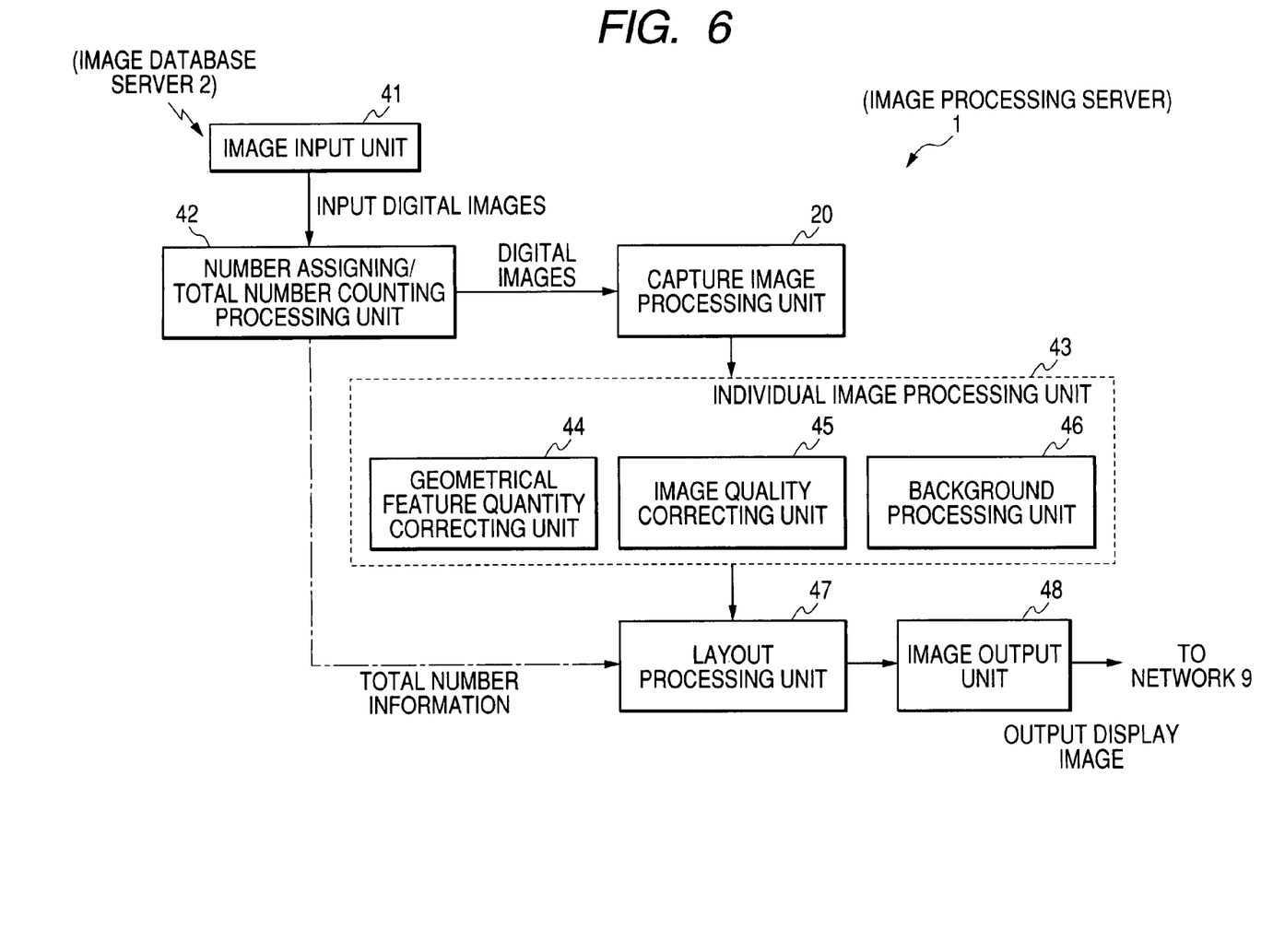
FIG. 6 shows blocks for performing the integrated layout processing.

FIG. 6 shows blocks for performing the unified layout processing that is exemplified in FIG. 5. The image processing server 1 that performs the unified layout processing is equipped with an image input unit 41 for receiving a plurality of digital images from the image database server 2 and a number assigning/total number counting processing unit 42 for performing assigning of image numbers and total number counting on the plurality of digital images that have been input through the image input unit 41. The image processing server 1 is also equipped with an individual image processing unit 43 for performing image processing on each of the digital images that have been assigned the numbers by the number assigning/total number counting processing unit 42 and that have been subjected to the spot color processing in the capture image processing unit 20. The individual image processing unit 43 is equipped with a geometrical feature quantity correcting unit 44 for correcting geometrical feature quantities such as the position, size, inclination, etc. of an object, an image quality correcting unit 45 for correcting image quality such as the lightness, color, gray balance, gradation, etc., and a background processing unit 46 for performing background corrections such as background elimination and background unification. The image processing server 1 is also equipped with a layout processing unit 47 for performing, on the basis of the total number information supplied from the number assigning/total number counting processing unit 42, layout processing on the plurality of digital images that have been image-processed by the individual image processing unit 43, and an image output unit 48 for outputting an array image produced by the layout processing to the network 9. The functional configuration of FIG. 6 makes it possible to produce an output image in which a plurality of digital images are arrayed as exemplified in FIG. 5.

As described above in detail, according to the embodiment, a high-priority color such as a corporate color or a commodity image color in a photograph image (digital image data) obtained by capturing a commodity or the like can be reproduced properly, whereby maximum commodity or brand image appeal can be attained. According to the embodiment, digital image data taken under different conditions (light sources, locations, time of the day, etc.) or by different digital cameras 4 can be given the same color when they are put into a database and displayed or printed in an array. This makes it possible to give a consistent commodity or brand impression. Further, the same brand color, corporate color, or an image color can be reproduced consistently even if the package print color itself varies among commodities.

An image processing method according to the embodiment is effectively used for a captured image and can be applied to a raster image of a general image database or the like, a CG (computer graphics) image, and a graphics image, characters, and a logo image in a general document.

It is expected that the embodiment is used in various forms such as an application form, a printer driver form, and a form of cooperation with a digital camera. An exemplary application form is such that the embodiment is used as a function of making an album using images taken by a digital camera 4 or a function of automatically adjusting images acquired by a user as a plug-in or the like of management software. An exemplary printer driver form is such that the embodiment is used as a function that can be selected as an optional function in driver setting or a function that is incorporated in mode setting itself. An exemplary form of cooperation with a digital camera 4 is such that the embodiment is used as a function that enables issuance of an adjustment instruction at a printing stage (tag information is buried in a file format).

A computer program to which the embodiment is applied is supplied to the computers (user terminals) such as the image processing server 1, the image transfer apparatus 5, the display apparatus 6, and the printing image processing apparatus 8 not only in such a manner that it is installed in the computers but also in a form that it is stored in a storage medium so as to be readable by the computers. Exemplary storage media are various DVDs, CD-ROM media, and card-type storage media. The program is read by a DVD or CD-ROM reading device, a card reading device, or the like that is provided in each of the above computers. The program is stored in any of various memories of each of the above computers such as an HDD and a flash ROM and executed by a CPU. Alternatively, the program may be supplied from a program transmission apparatus via a network.

For example, the invention can be applied to a computer that is connected to an image forming apparatus such as a printer, a server that presents information via the Internet or the like, and a digital camera, as well as a program that is executed in those various kinds of computers.

The image processing apparatus according to one aspect of the invention includes: a region recognizing unit for recognizing a region to be subjected to spot color processing in a digital image that is read from an image database in which digital images such as captured images are stored; a color information acquiring unit for acquiring target color information to serve as a replacement target in the spot color processing; and a converting unit for converting color information of the region recognized by the region recognizing unit into the target color information acquired by the color information acquiring unit. The target color information may be a corporate color and/or a commodity main color in a captured image.

The image processing apparatus may further include a color converting unit for converting the color information of the region recognized by the region recognizing unit into information in a color space that is defined by a lightness axis and color axes. The converting unit may convert color signals representing the color information of the region into color signals representing the target color information. It is preferable that the converting unit is configured to store a gradation signal of the color information of the region and converts only color signals of the color information of the region into color signals of the target color information. This is because the captured image is reproduced naturally.

The color information acquiring unit may be configured to recognize a spot color that is designated by a user, and reads out color information of the recognized spot color that is stored in a spot color database. In this case, the color information acquiring unit may be configured to acquire, as the target color information, color information represented by a Pantone number or a DIC number.

An image processing apparatus according to another aspect of the invention includes: an image input unit for receiving a plurality of digital images that are read from an image database in which digital images are stored; a preprocessing unit for performing preprocessing on each of the plurality of digital images received by the image input unit; an object recognizing unit for recognizing a region to be subjected to spot color processing for each of the plurality of digital images on which the preprocessing has been performed by the preprocessing unit; and a spot color processing unit for converting color information of the region recognized by the object recognizing unit into the same spot color for each of the plurality of digital images.

The spot color processing unit may be configured to store a gradation representation of the region recognized by the object recognizing unit and converts a color representation of the region into the spot color. In other words, spot color processing unit may be configured to replace only color signals representing the color information of the region with color signals representing color information of the spot color. The image processing apparatus may further include a spot color processing unit that recognizes a spot color that is designated by a user, and reads out color information of the recognized spot color stored in a spot color database.

The invention can also be expressed in a method category. That is, an image processing method according to the invention includes the steps of reading a digital image from storing unit that is a database in which digital images are stored, and determining a color replacement subject region in the digital image; replacing a color of the determined subject region with a corporate color and/or a commodity main color; and storing, in the storing unit, the digital image in which the color of the subject region has been replaced.

The image processing method may further include the step of reading a digital image from the storing unit and performing preprocessing on the digital image, and the method may be configured to, in the subject region determining step, determine a color replacement subject region in the digital image that has been subjected to the preprocessing.

The image processing method may further include the step of converting the color of the determined subject region into signals of a luminance/color difference system such as L*a*b* or YCC, and the step of replacement with a corporate color and/or a commodity main color stores a luminance signal (L*, Y, or the like) of the subject region and replaces color difference signals (a*b*, CC, or the like) of the subject region with color difference signals representing the corporate color and/or the commodity main color.

The image processing method may further include the step of reading, from the storing unit, a plurality of digital images in each of which the color of the subject region has been replaced, and outputting the plurality of digital images in an array.

On the other hand, the invention can also be expressed as a program product for causing a computer to execute prescribed processes. That is, a program product according to the invention causes a computer to execute: reading a digital image from storing unit and determining is a color replacement subject region in the digital image; replacing a color of the determined subject region with a corporate color and/or a commodity main color, storing, in the storing unit, the digital image in which the color of the subject region has been replaced; and reading, from the storing unit, a plurality of digital images in each of which the color of the subject region has been replaced, and outputting the plurality of digital images in an array.

The program product may be configured to further cause the computer to execute recognizing a user instruction that is necessary for conversion into the corporate color and/or the commodity main color; and acquiring color signals representing the corporate color and/or the commodity main color from a memory on the basis of the recognized user instruction.

In this entire specification, the terms "image data (digital image data)" and "image (digital image)" are used as having approximately the same meaning. The term "user instruction (designation)" means an instruction (designation) that is input through a prescribed user terminal. The "user terminal" may be a computer that is connected via a network or a computer that functions as an image processing apparatus by itself. Although the different terms "luminance signal" and "lightness signal" are used depending on the type of signals, they are handled as similar signals as long as the functions employed in the invention are concerned. The same applies to the terms "color difference signals" and "color signals."

According to the invention, it becomes possible to properly reproduce a corporate color, a commodity image color, or the like and thereby attain sufficient commodity or brand image appeal.

Although the present invention has been shown and described with reference to a specific embodiment, various changes and modifications will be apparent to those skilled in the art from the teachings herein. Such changes and modifications as are obvious are deemed to come within the spirit, scope and contemplation of the invention as defined in the appended claims.

[FIG. 1]
1: IMAGE PROCESSING SERVER
2: IMAGE DATABASE SERVER
3: IMAGE DB
4: (DIGITAL CAMERA)
5: (IMAGE TRANSFER APPARATUS)
6: (DISPLAY APPARATUS)
7: PRINTER
8: (PRINTING IMAGE PROCESSING APPARATUS)
9: (NETWORK)

[FIG. 2]
1 (IMAGE PROCESSING SERVER)
IMAGE DATABASE SERVER 2
11: IMAGE INPUT UNIT
12: IMAGE OUTPUT UNIT
13: USER PROCESSING SUBJECT DESIGNATION INPUT UNIT
20: CAPTURE IMAGE PROCESSING UNIT
21: PREPROCESSING UNIT
22: OBJECT RECOGNIZING UNIT
23: SPOT COLOR PROCESSING UNIT
23 (SPOT COLOR PROCESSING UNIT)
31: USER SPOT COLOR DESIGNATION INPUT UNIT
32: SPOT COLOR DB
33: 1ST COLOR CONVERTING UNIT
34: COLOR REPLACING UNIT
35: 2ND COLOR CONVERTING UNIT

[FIG. 3]
START
S101: ADJUST DYNAMIC RANGE, WHITE POINT, ETC.
S102: SEPARATE PHOTOGRAPHED OBJECT AND BACKGROUND FROM EACH OTHER.
S103: DETERMINE REGION TO BE SUBJECTED TO SPOT COLOR PROCESSING.
S104: CONVERT PREPROCESSED RGB SIGNALS INTO L*a*b* SIGNALS.
SlO5: RECOGNIZE DESIGNATED SPOT COLOR.
S106: READ OUT TARGET SIGNALS OF SPOT COLOR.
S107: STORE LIGHTNESS SIGNAL L* FOR PROCESSING SUBJECT REGION, AND CONVERT ONLY COLOR SIGNALS a*b* OF INPUT SIGNALS INTO TARGET SIGNALS OF SPOT COLOR.
S108: CONVERT PROCESSED L*a*b* SIGNALS INTO RGB SIGNALS.
END

[FIG. 4]
TARGET a*b* VALUES
a*b* VALUES OF INPUT IMAGE

[FIG. 5]
A: INPUT DIGITAL IMAGES
B: OUTPUT DISPLAY IMAGE
C: CONVERSION
D: SPOT COLOR
E: Print
F: Store

[FIG. 6]
1 (IMAGE PROCESSING SERVER)
IMAGE DATABASE SERVER 2
TO NETWORK 9
20: CAPTURE IMAGE PROCESSING UNIT
41: IMAGE INPUT UNIT
42: NUMBER ASSIGNING/TOTAL NUMBER COUNTING PROCESSING UNIT
43: INDIVIDUAL IMAGE PROCESSING UNIT
44: GEOMETRICAL FEATURE QUANTITY CORRECTING UNIT
45: IMAGE QUALITY CORRECTING UNIT
46: BACKGROUND PROCESSING UNIT
47: LAYOUT PROCESSING UNIT
48: IMAGE OUTPUT UNIT
A: INPUT DIGITAL IMAGES
B: DIGITAL IMAGES
C: TOTAL NUMBER INFORMATION
D: OUTPUT DISPLAY IMAGE

What is claimed is:

1. An image processing apparatus comprising:
a color information acquiring unit that acquires a target color information, wherein the target color is a corporate color and or a main color of a commodity main color included in the captured image;
a region recognizing unit that recognizes a subject region, of a digital image, having a color within a prescribed range from the target color, the digital image being read from an image database in which a plurality of digital images are stored; and
a converting unit that converts the color of the recognized subject region into a-luminance signal and a color difference signal and replaces the color difference signal of the color of the recognized subject region with a color difference signal of the target color, with the luminance signal being preserved.

2. The image processing apparatus according to claim 1, wherein the digital image is a captured image.

3. The image processing apparatus according to claim 1, wherein the color information acquiring unit recognizes the target color that is designated by a user.

4. The image processing apparatus according to claim 3, wherein the the target color is designated using a Pantone number or a DIC number.

5. An image processing apparatus comprising:
an image input unit that receives a plurality of digital images that are read from an image database in which digital images are stored;
an object recognizing unit that recognizes a subject region, of the plurality of received digital images, based on at least one of a corporate color, a commodity image color, a package shape of a commodity and a logo shape; and
a spot color processing unit that converts the color of the recognized subject region into a luminance signal and a color difference signal and replaces the color difference signal of the color of the recognized subject region with a color difference signal of the target color, with the luminance signal being preserved.

6. The image processing apparatus according to claim 5, further comprising:
a preprocessing unit that performs preprocessing on each of the plurality of digital images received by the image input unit,
wherein the object recognizing unit recognizes the subject region of each digital image on which the preprocessing has been performed by the preprocessing unit.

7. The image processing apparatus according to claim 5, wherein the spot color processing unit replaces the color of each recognized subject region with the spot color while retaining gradation information of each recognized subject region.

8. The image processing apparatus according to claim 5, wherein the spot color processing unit recognizes the spot color that is designated by a user.

9. An image processing method comprising:
reading a digital image from a storing unit in which a plurality of digital images are stored;
determining a subject region, of the digital image, having a color within a prescribed range from a target color, the target color being a corporate color or a commodity main color;
converting the color of the determined subject region into a luminance signal and color differenced signal;
replacing the color difference signal of the color of the determined subject region with a color difference signal of the target color with the luminance signal being preserved; and
storing the digital image in which the color difference signal of the color of the subject region has been replaced.

10. The image processing method according to claim 9, further comprising:
performing preprocessing on the digital image wherein the determining the subject region determines the subject region of the preprocessed digital image.

11. The image processing method according to claim 9, further comprising:
reading, from the storing unit, a plurality of digital images in each of which the color of the subject region being replaced; and
outputting the plurality of digital images in a form arranged in a pattern.

12. A computer-readable medium storing a program that causes a computer to execute procedures comprising:
reading a digital image from storing unit in which a plurality of digital images are stored;
determining a subject region, of the digital image, having a color within a prescribed range from a target color, the target color being a corporate color or a commodity main color;
converting the color of the determined subject region into a luminance signal and a color difference signal;
replacing the color difference signal of the color of the determined subject region with a color difference signal of the target color with the luminance signal being preserved; and
storing the digital image in which the color difference signal of the color of the subject region has been replaced in the storing unit.

13. The computer-readable medium according to claim 12, wherein the procedures further comprises:
reading, from the storing unit, a plurality of digital images in each of which the color of the subject region being replaced; and
outputting the plurality of digital images in a form arranged in a pattern.

14. The computer-readable medium according to claim 12, wherein the procedures further comprises:
recognizing a user instruction for replacing the determined subject region with the color including at least one of the corporate color and the commodity main color; and
acquiring color signals representing the corporate color or the commodity main color from a memory on the basis of the recognized user instruction.

* * * * *